J. GUERZONI & R. PECHKRANZ.
PROJECTION APPARATUS.
APPLICATION FILED OCT. 23, 1913.
1,153,685.  Patented Sept. 14, 1915.
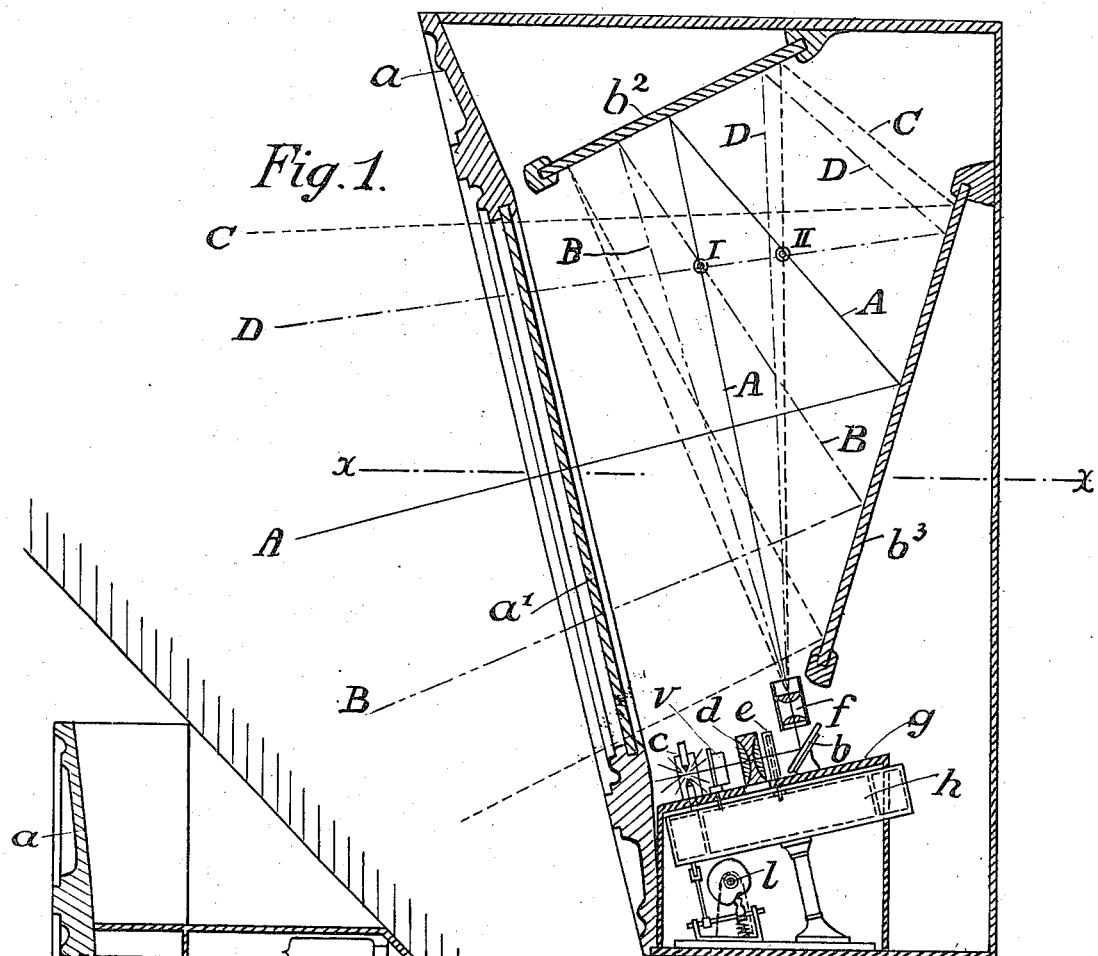
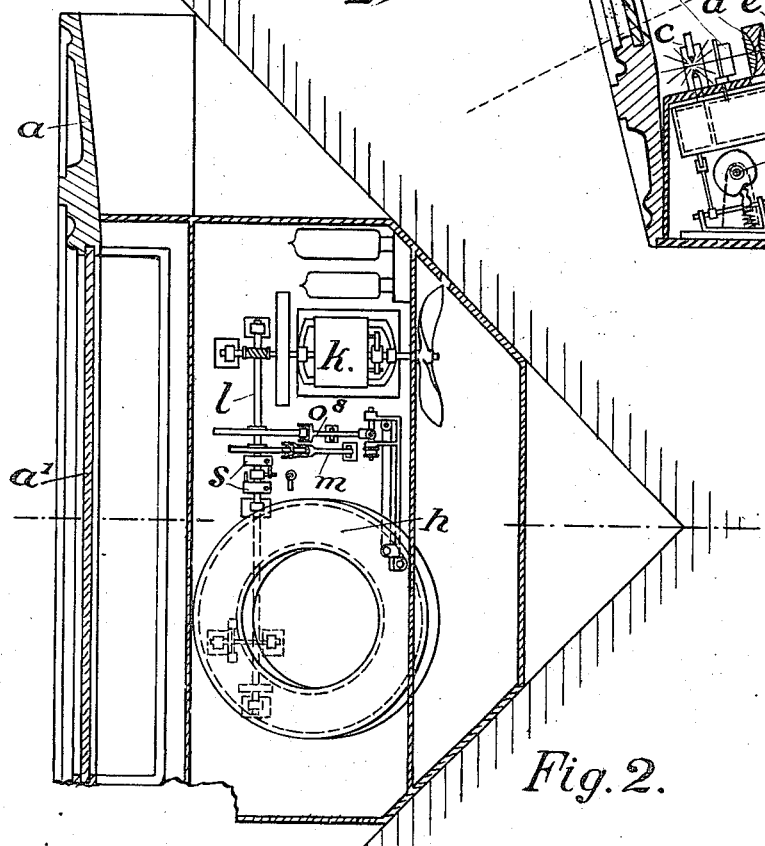

UNITED STATES PATENT OFFICE.

JOSEPH GUERZONI AND RODOLPHE PECHKRANZ, OF GENEVA, SWITZERLAND.

PROJECTION APPARATUS.

1,153,685.  Specification of Letters Patent.  Patented Sept. 14, 1915.

Original application filed May 12, 1911, Serial No. 626,774. Divided and this application filed October 23, 1913. Serial No. 796,846.

*To all whom it may concern:*

Be it known that we, JOSEPH GUERZONI, tradesman, and RODOLPHE PECHKRANZ, engineer, citizens of Switzerland, residing at Geneva, Canton of Geneva, in the Confederation of Switzerland, have invented certain new and useful Improvements in Projection Apparatus, of which the following is a specification.

This application is a division of our copending application, Serial No. 626,774, filed May 12, 1911, for Letters Patent for an improvement in projection apparatus, and the invention relates to improvements in devices for projecting enlarged images upon a screen and its purpose is to render the apparatus, regarding the degree of enlargement of images, less dependent of the projecting distance in the room, outside of the apparatus, by performing the enlargement to a great deal already inside of the apparatus, thus furnishing means of projecting very enlarged images even in narrow rooms with reflectors and apparatus rather smaller in size than those hitherto in use.

To this end the invention consists of the combination with any suitable image producing system and a projecting lens, of two reflectors acting together with the screen, formed by the greater transparent portion of the front wall of the casing, like a prism, so as to gain in projecting length, by projecting the received rays in a closed path, where they cross three times before reaching the screen, and will therefore produce a very enlarged image on the screen.

In the drawing, Figure 1 is a central sectional elevation of the apparatus comprising our present invention, and Fig. 2 is a cross section on the line $x\,x$, Fig. 1.

The whole apparatus is inclosed within a casing $a$ shaped like an inverted obelisk with vertical side and back walls and an overhanging front wall, which is formed by a transparent screen $a^1$ surrounded by a frame $a^2$. Just opposite to the screen on the back wall a mirror $b^3$ is attached, reflecting to the screen $a^1$ all rays of light coming from a smaller mirror $b^2$ attached at the top and at the inside of the casing. This mirror $b^2$ reflects to the larger mirror $b^3$ all the rays coming from a smaller mirror $b^1$ attached to an inclined platform $h$ fixed at the bottom of the casing. On this platform are mounted, in the usual arrangement, all the optical parts of the apparatus for producing the image, and there are representing: $c$ a lamp, $d$ a shutter for hiding or unhiding the same, $e$ a condensing system, $f$ a receptacle for receiving the transparent slides to be reproduced and $g$ a projecting lens for transmitting to the mirror $b^2$ all the rays coming from the mirror $b^1$ which is receiving the image projected by the condensing system $e$. All other mechanical parts, for the automatic feeding, are mounted underneath the platform. It is obvious, that by this arrangement of parts all the space inside the casing has been made useful for gaining in projecting distance with a view of magnifying the image produced in the system on the platform $h$ and that therefore on the screen $a^1$ an image of very enlarged size will be obtained, which will allow of employing the projecting apparatus even in very narrow rooms, where the outside distance between apparatus and image is of course a very small one. It will also be apparent that in constructing the apparatus, in placing the projecting devices and mirrors as hereinbefore described, the rays of light traverse the space within the casing in a three-fold path. That is to say, every point within the casing which is subjected to the light is traversed by three rays thereof. For example, the point indicated at $l$ is traversed by the ray A as the same is reflected from the objective lens $g$ to the mirror $b^2$, by the ray B as the same is reflected from the mirror $b^2$, and by the ray D as the same is reflected from the mirror $b^3$. Similarly, for example, the point indicated at II is traversed by the ray C as the same is reflected from the objective lens $g$, by the ray A as the same is reflected from the mirror $b^2$, and by the ray D as the same is reflected from the mirror $b^3$.

We are well aware that similar apparatus have already been devised, with reflectors arranged inside of the same, but less with the purpose of obtaining enlarged images and also quite unsufficient regarding the degree of enlargement obtained of the image. This is owing to the fact, that there was not made use of the crossing of the rays, so that in the mentioned apparatus even a small transparent portion of the front wall of the casing would be made useful as screen. Besides the apparatus had to be considerably increased in size in order to include all the parts which all together would render it also improper for projecting purposes in small and narrow rooms.

We claim as our invention.

In a picture projecting apparatus and in combination, a casing, an image producing device located adjacent the bottom of the casing, a mirror fixed adjacent the top of the casing and against which the rays of light from the image producing devices are projected and from which they are reflected toward the said image producing devices, a mirror fixed adjacent the rear wall of the casing and to which the rays of light are reflected from the aforesaid mirror, and from which the rays of light are reflected so as to cross the path in which they are reflected from the image producing devices to the mirror at the top of the casing, and a transparent screen in the front of the casing and to which the rays of light are reflected from the said mirror adjacent the rear of the casing.

In testimony whereof we have affixed our signatures in presence of two witnesses.

JOSEPH GUERZONI.
RODOLPHE PECHKRANZ.

Witnesses:
G. TUIER,
LOVISTO MUNIER.